United States Patent
Hamada et al.

[11] Patent Number: 5,886,728
[45] Date of Patent: Mar. 23, 1999

[54] IMAGE FORMING APPARATUS HAVING A PLURALITY OF EXPOSURE DEVICES WHICH ARE RADIALLY ARRANGED ON A COMMON SUPPORTING MEMBER WITH RESPECT TO A ROTATION AXIS OF AN IMAGE FORMING BODY

[75] Inventors: Shuta Hamada; Satoshi Haneda; Hisayoshi Nagase; Hiroyuki Tokimatsu; Masahiro Onodera, all of Hachioji; Toshihide Miura, Koganei, all of Japan

[73] Assignee: Konica Corporation, Tokyo, Japan

[21] Appl. No.: 755,288

[22] Filed: Nov. 22, 1996

[30] Foreign Application Priority Data

Nov. 30, 1995 [JP] Japan ................................ 7-312248
Dec. 4, 1995 [JP] Japan ................................ 7-315343

[51] Int. Cl.⁶ .................... G03G 15/01; G03G 15/04; G01D 15/14; H04N 1/29
[52] U.S. Cl. .................... 347/242; 347/263; 399/150; 399/177
[58] Field of Search .................... 347/130, 242, 347/263; 399/150, 130, 177

[56] References Cited

U.S. PATENT DOCUMENTS

| | | |
|---|---|---|
| 2,201,473 | 5/1940 | Carlson .................... 347/263 |
| 4,338,615 | 7/1982 | Nelson et al. .................... 347/130 |
| 4,541,706 | 9/1985 | Kishi .................... 347/130 X |
| 4,931,876 | 6/1990 | Hashizume .................... 347/130 X |
| 5,532,796 | 7/1996 | Narikawa et al. .................... 399/152 |
| 5,581,291 | 12/1996 | Nishiguchi et al. .................... 347/130 X |
| 5,608,498 | 3/1997 | Nagase et al. .................... 399/130 |

*Primary Examiner*—Fred L Braun
*Attorney, Agent, or Firm*—Frishauf, Holtz, Goodman, Langer & Chick

[57] ABSTRACT

An image forming apparatus has an image forming body which is rotatable in a subsidiary scanning direction. A plurality of imagewise exposure devices for imagewise exposing the image forming body are arranged to face the image forming body and to be aligned in a straight line in a primary scanning direction perpendicular to the subsidiary scanning direction of the image forming body. A common supporting member is provided for supporting the plurality of exposure devices, and bearing members are provided on first and second ends of the common supporting member. The plurality of exposure devices are: (i) radially arranged on the common supporting member with respect to a rotation axis of the image forming body, and (ii) fixed on the supporting member with respect to the bearing members, and the image forming body is rotatable against the common supporting member through the bearing members.

16 Claims, 12 Drawing Sheets

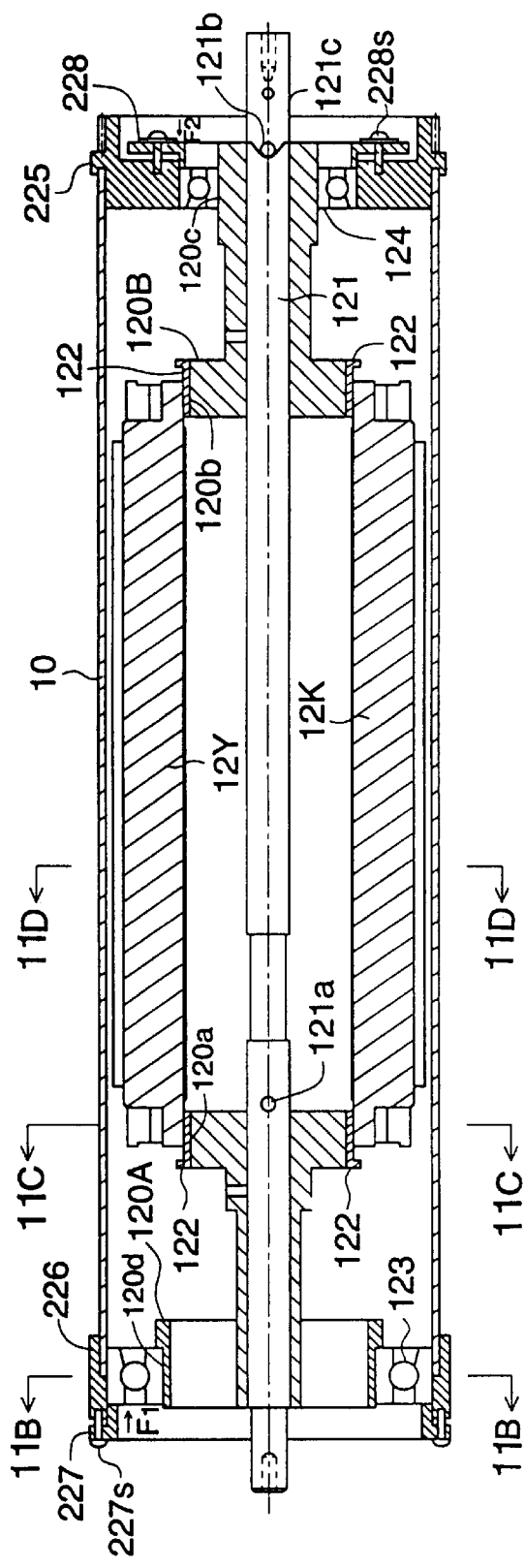
FIG. 11 (A)
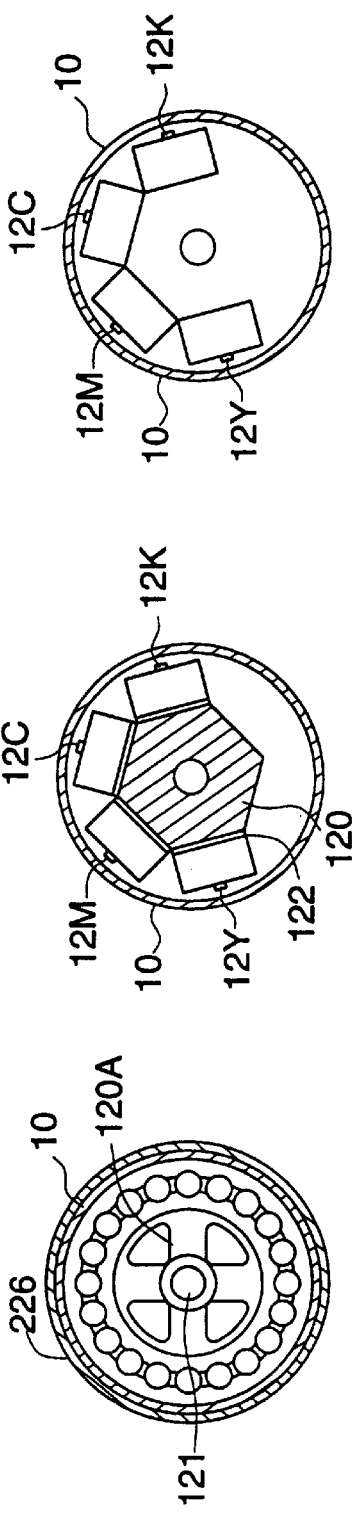
FIG. 11 (D)
FIG. 11 (C)
FIG. 11 (B)

IMAGE FORMING APPARATUS HAVING A PLURALITY OF EXPOSURE DEVICES WHICH ARE RADIALLY ARRANGED ON A COMMON SUPPORTING MEMBER WITH RESPECT TO A ROTATION AXIS OF AN IMAGE FORMING BODY

BACKGROUND OF THE INVENTION

The present invention relates to an electrophotographic type image forming apparatus in which a charging means, an image exposure device and a developing means are arranged around an image forming body for image formation, in an image forming apparatus such as copiers, printers, facsimiles, or similar apparatus. Specifically, the present invention relates to a holding structure for an image forming body, rotated in the subsidiary scanning direction in an electrophotographic type color image forming apparatus, in which a plurality of chargers, image exposure devices and developing devices are arranged around an image forming body, and whereby toner images are superimposed on the image forming body during a single rotation of the image forming body for color image formation.

As a multi-color image forming apparatus, the following apparatuses (A), (B) and (C) are generally known:

(A) A color image forming apparatus in which the same number of photoreceptors, chargers, developing devices as the number of necessary colors are provided, whereby a monochromatic toner image formed on each photoreceptor is superimposed on an intermediate transfer body, or similar devices, to form a color image.

(B) A color image forming apparatus in which a single photoreceptor is rotated plural times, and charging, image exposure, and developing are repeated for each color to form a color image.

(C) A color image forming apparatus in which charging, image exposure, and developing are successively conducted for each color during one rotation of a single photoreceptor to form a color image.

However, the apparatus (A) requires a plurality of photoreceptors and an intermediate transfer body, resulting in a disadvantageous increase in overall size of the apparatus. The apparatus (B) has only one charging means, image exposure means, and photoreceptor, and therefore, the overall size of the apparatus is decreased. However, apparatus (B) has a limitation in that the size of the image is limited to less than the surface area of the photoreceptor. The apparatus (C), moreover can form an image at high speed, but it requires that a plurality of sets of a charger, an image exposure means, and a developing device are provided around the periphery of the photoreceptor. Further, in the apparatus (C), there is the possibility that the optical system which conducts image exposure is stained by toner leaked from the adjoining developing device, which reduces the image quality. In order to avoid that, it is required to enlarge the interval between the image exposure means and the developing device, whereby the diameter of the photoreceptor is inevitably increased, resulting in an increase of the overall apparatus, which is a problem.

In order to avoid the disadvantages of the apparatus (C), an apparatus (D) has been proposed, (Japanese Patent Publication Open to Public Inspection No. 307307/1993), in which the base body of the image forming body is formed of a transparent material; a plurality of image exposure means are housed inside the image forming body; and an image is exposed on a photoreceptor layer formed on the outer periphery of the image forming body through the transparent base body.

The image forming apparatus (C) and (D) can form a color image during a single rotation of the image forming body. As a result, the image recording time period can be shortened, so that high speed recording can be carried out. This apparatus is also effective for an increase of image quality.

In the above image forming apparatus (D), an apparatus of the type (hereinafter, which is called the optical system including type) has been proposed in which a linear image exposure means for each color is arranged inside the image forming body composed of a transparent base body and an optical semiconductor. The image forming apparatus having the optical system included-type exposure means has an advantage in which the overall size of the image forming body can be reduced, so that the apparatus is structured more compactly.

In the image forming apparatus having the optical system included-type exposure means, a light collection position by each linear light emitting means accurately coincides with the image forming surface on the peripheral surface of the image forming body, and arrangement positions of linear light emitting means are required to be accurately parallel to each other with a predetermined interval. Accordingly, conventionally, each linear exposure optical system is temporarily attached to an optical system supporting body, color image processing is carried out using the image forming devices housed in the image forming body, image quality of the formed image is checked, and the attached position of each linear light emitting means is then corrected. The adjusting operation for this position correction requires a technician's skill and a long period of time, which is a problem for assembling the apparatus. Alternatively, each linear exposure optical system is attached to the optical system supporting body, and position adjustment and focus adjustment are carried out using optical system assembling jigs. Then the linear exposure optical system is fixed onto the optical system supporting body, and after the image forming body and a position regulation member (bearing member) are arranged, these assemblies are mounted at a predetermined position in the image forming apparatus. However, in the above conventional adjustment, even when the adjustment is correctly carried out by the optical system assembling jigs, when the linear exposure optical system is mounted into an actual image forming apparatus, a problem occurs in that the accuracy of the focus of the optical system, and the positional accuracy in the primary scanning direction or in the subsidiary scanning direction are lowered due to the accuracy of the position regulating member or assembling errors of the optical supporting body itself. As a result, re-adjustment is required after the optical systems have been mounted into the actual apparatus.

In conventional systems, the position of the shaft of the supporting body is a reference position, and therefore, it is necessary that this position of the shaft is very accurately determined for assembling. For example, as shown in FIG. 14(A), if the shape of the supporting body SPT itself is not accurate, when an optical system LED is mounted onto the supporting body SPT, the LED is moved in the arrowed direction and the mounting position is adjusted so that the optical system LED is focused on a sensor S, and is mounted on the supporting body SPT through a spacer SP having an appropriate thickness, using a reference pin PIN corresponding to a shaft hole H of the supporting body and a mounting jig J having a mounting arm ARM. Accordingly, distance "a" between an axis A of the supporting body SPT and the sensor S is constant.

After the LED has been thus mounted onto the supporting body SPT, when a bearing B and a photoreceptor PR are mounted onto the supporting body SPT, as shown in FIG. 14(B), an actual rotation center C is determined by the bearing, and there is a deviation between the rotation center C and the axis A of the supporting body SPT. As a result, a distance "d" in FIG. 14(B) fluctuates, and the LED can not be accurately focused on the surface of the photoreceptor PR corresponding to the mounting position of the sensor S.

That is, when the shape of the supporting body itself is not accurate as shown in FIG. 14(A), the optical system (LED or the like) can not be accurately mounted with respect to the rotation center. In other words, there is a problem in that the distance between the photoreceptor and the optical system fluctuates (conventionally, this is due to problems with respect to the tolerance of parts or the tolerance of assembly), and therefore, inevitably, material is required to be processed more accurately, or it is inevitable to disregard several fluctuations.

This results from the fact that the actual rotation center is not used as the reference. Because the optical system and its supporting member are not necessary to be rotated, it is necessary that the rotation member, which actually contributes to the rotation, is used as the reference, and this point is improved in the present invention.

An image forming body which is located at an image forming position of the plurality of exposure means, and on which superimposed images are formed by a plurality of exposure means, is required to be accurately held so that the image does not deviate in the primary scanning direction, and to be rotatably accurately supported so that the focus is not shifted.

Conventionally, an ordinal radial bearing is used for a bearing member which holds the rotating image forming body. However, in the radial ball bearing, movement errors tend to occur in the thrust direction, so that mechanical play of several 10 $\mu$m occurs in the primary scanning direction of the image forming body. When a color image is formed by using the image forming body supported by such bearing member, doubling occurs in the superimposed images.

SUMMARY OF THE INVENTION

In an image forming apparatus having an optical system included-type exposure means, the first object of the present invention is to provide an image forming apparatus in which: (i) the accuracy of the mounting position of a linear exposure optical system onto an optical system supporting body is increased; (ii) a decrease of the time period for mounting and adjusting operations and an increase of ease of operation are attained; and (iii) as a result, an excellent image is obtained.

In an image forming apparatus having an optical system included type exposure means, the second object of the present invention is to provide an image forming apparatus in which a color shifting of a color image, caused by the bearing member, is minimized.

The first structure to attain the first object is as follows.

An image forming apparatus comprising: an image forming body rotating in the subsidiary scanning direction; a plurality of image exposure means composed of a plurality of light emitting elements and image forming elements, arranged linearly in the primary scanning direction for image-exposure onto the image forming body; and an optical supporting body to support the plurality of image exposure means at a predetermined position. The image forming apparatus is characterized in that: a supporting portion to support the image exposure means is provided on the optical supporting body; and a position regulation member to regulate the image forming position of the image exposure means onto the image forming body is integrally provided at end portions of the optical supporting body.

The second structure to attain the first object is as follows.

An image forming apparatus comprising: an image forming body rotating in the subsidiary scanning direction; a plurality of image exposure means composed of a plurality of light emitting elements and image forming elements, arranged linearly in the primary scanning direction for image-exposure onto the image forming body; and an optical supporting body to support the plurality of image exposure means at a predetermined position. The image forming apparatus characterized in that: a position regulating member for regulating the mounting position onto the image forming body is integrally fixed to the end portions of the optical supporting body, on which a supporting portion to support the image exposure means is provided; and after the image exposure means has been fixed onto the optical supporting body by regulating the mounting position, using an exposure optical system assembling jig having a light detecting means fixedly arranged at the outside of the image exposure means, using a movement means by which the image exposure means is held and moved, the image exposure means, the optical supporting body and the position regulating member are inserted into the image forming body through the position regulating member, and fixed in place.

The structure to attain the second object is as follows.

An image forming apparatus comprising: an image forming body rotating in the subsidiary scanning direction; a plurality of image exposure means for image-exposure on the image forming body linearly arranged in the primary scanning direction; an optical supporting body to support the plurality of image exposure means at a predetermined position; a position regulating member having a rotating portion and a fixed portion, which are provided at the end portions of the optical supporting body, and which regulate the image forming position of the image exposure means onto the image forming body; and a pressing means to press the rotating portion of the position regulating member in the primary scanning direction of the image forming body.

BRIEF DESCRIPTION OF THE DRAWINGS

FIG. 11(A) is a sectional view showing a condition before the image forming body including the image exposure devices is assembled between fixed side plates. FIG. 11(B) is a sectional view taken on line 11(B)—11(B), FIG. 11(C) is a sectional view taken on line 11(C)—11(C), and FIG. 11(D) is a sectional view taken on line 11(D)—11(D) of FIG. 11(A).

DETAILED DESCRIPTION OF THE PREFERRED EMBODIMENT

Referring to FIGS. 1 through 3(B), an image forming process and each mechanism of a color image forming apparatus, which is preferable as an image forming apparatus in the following embodiments, will be described below as an example of the present invention.

Figure 1:
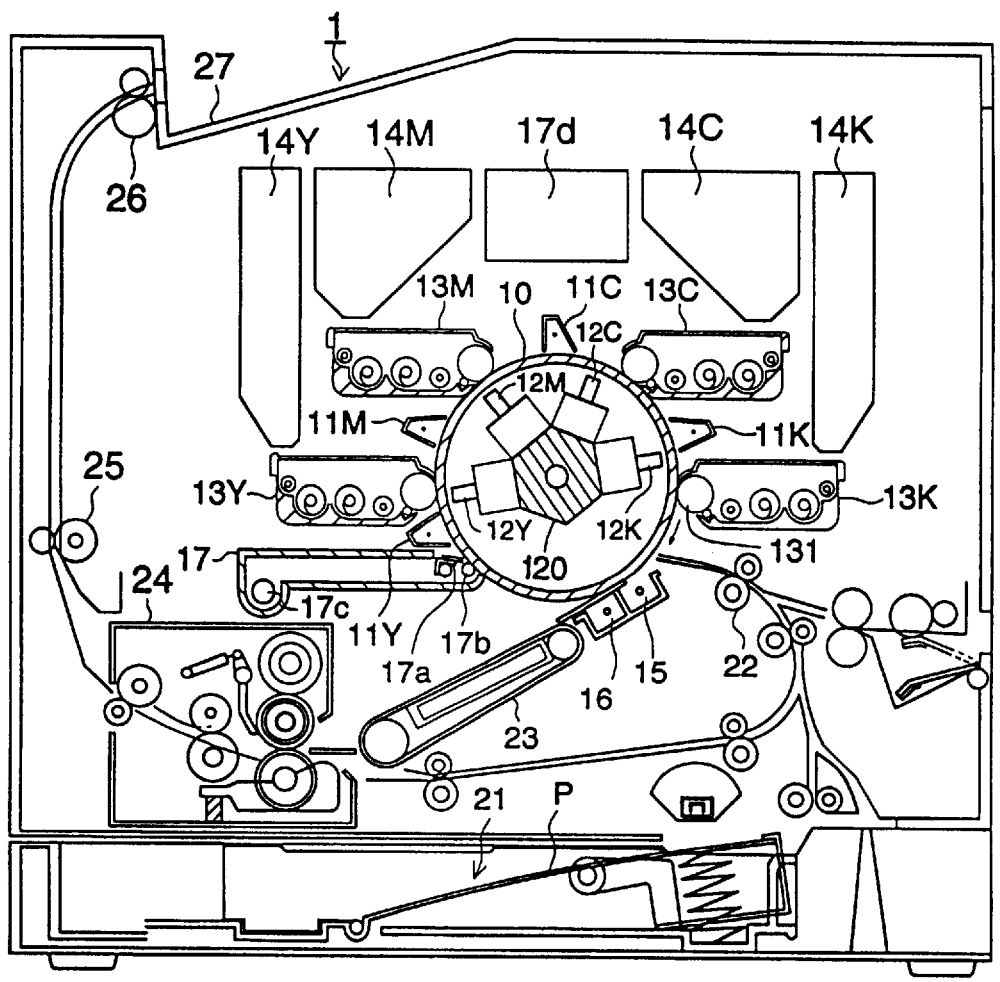
FIG. 1 is a sectional structural view of a color image forming apparatus which is preferable as an image forming apparatus in the present embodiment.
Figure 2:
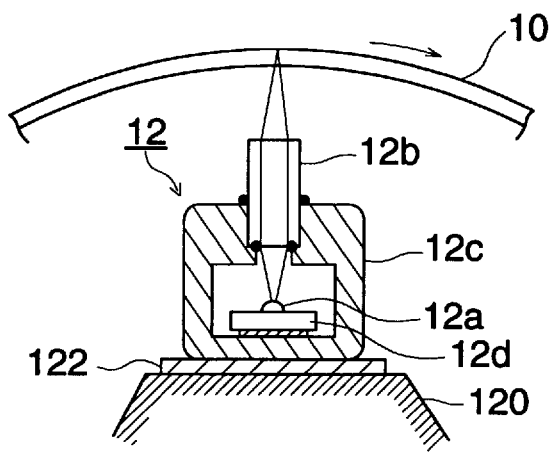
FIGS. 2(A) and 2(B) respectively show a sectional view of a main portion of an image exposure device, and its perspective view.
Figure 2:
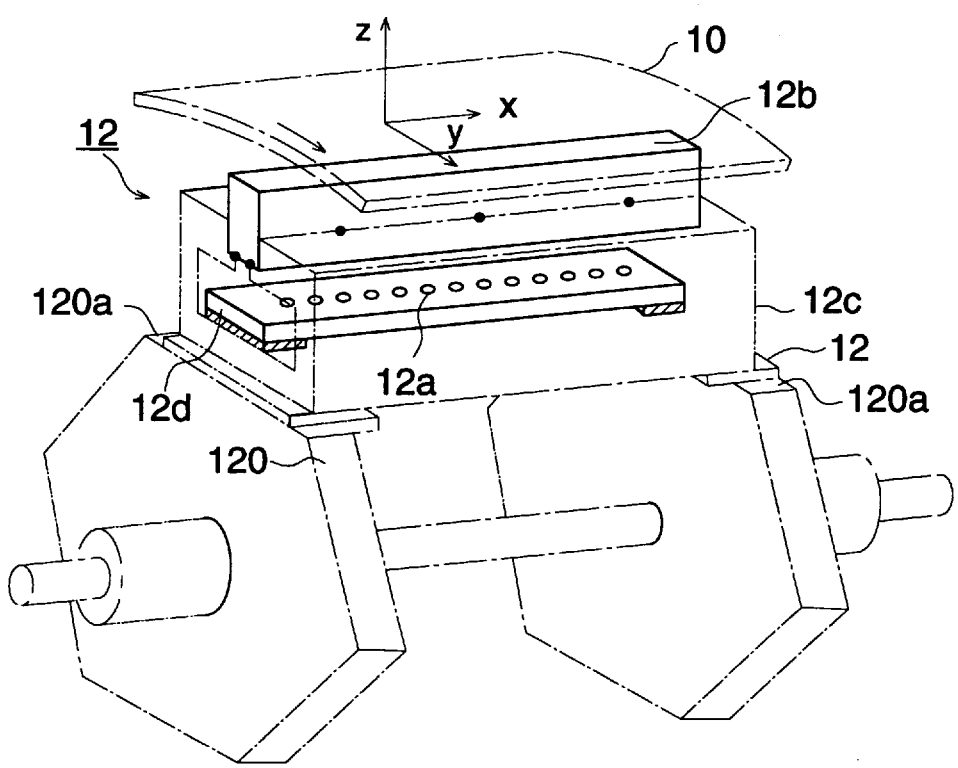
Figure 3:
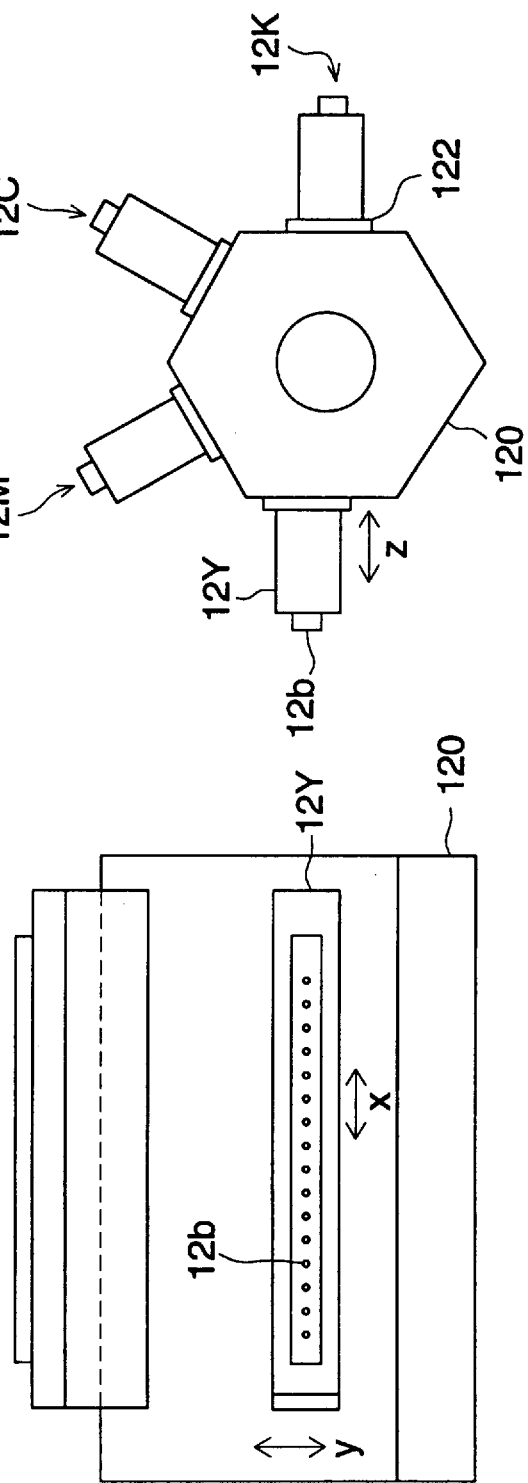
FIGS. 3(A) and 3(B) are respectively a side view and a front view, showing the mounted condition of the image exposure device onto the optical supporting body.
Figure 3:
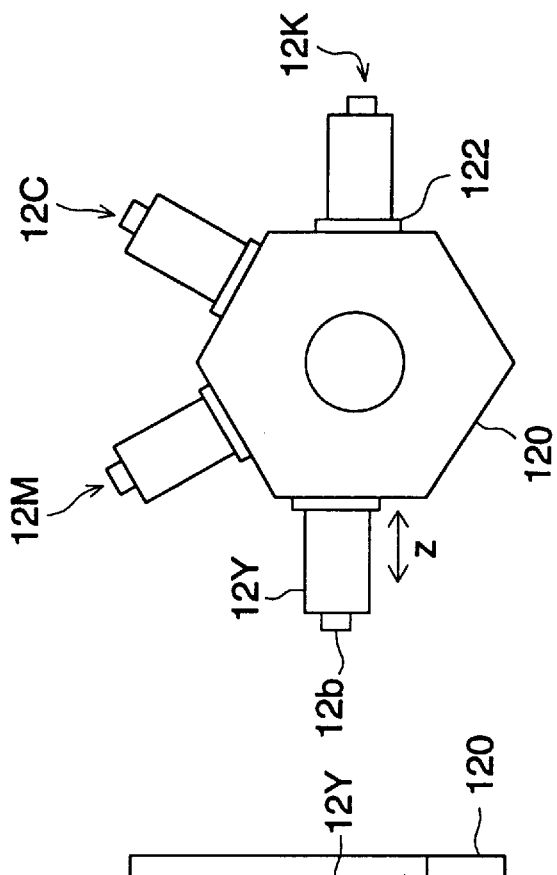

FIG. 1 is a sectional structural view of a color image forming apparatus (a color printer), which is preferable as an image forming apparatus according to the present invention.

A color image forming apparatus of the present invention is structured such that: a photoreceptor drum, in which an electrically conductive layer and a photoreceptor layer are provided on the outer peripheral surface of a transparent base body, is used as an image forming body; and image exposure devices are arranged inside the photoreceptor drum, and an image forming process means such as chargers, developing devices, a transfer device, a discharger, a cleaning device, etc., is arranged outside the photoreceptor drum.

A photoreceptor drum 10 which is an image forming body, is structured such that, for example, a cylindrical base body, formed of a transparent member of a transparent acrylic resin, is provided inside; a transparent conductive layer, and a photoreceptor layer formed of an a-Si layer, an organic photosensitive layer (OPC), or the like, are formed on outer periphery of the base body; and the base body is rotated clockwise while being electrically grounded.

In the present example, the transparent base body may have an amount of exposure, which can provide an appropriate contrast onto a light conductive layer on the photoreceptor drum. Accordingly, it is not necessary that a light transparency factor of a transparent base body of the photoreceptor drum be 100%, but may have a characteristic in which some amount of light is absorbed at the time of transmission of the exposure beam. As light transmissive base body materials, acrylic resin, especially, polymer of methacrylate methyl ester monomer is excellent in transparency, strength, accuracy, and surface property, and is preferably used. Further, any type of light transmissive resins such as acrylic resin, fluorine, polyester, polycarbonate, polyethylene terephtalate, etc., can be used. As a light transmission conductive layer, indium tin oxide (ITO), lead oxide, indium oxide, copper iodide, or a metallic film, in which light permeability is maintained, and which is formed of Au, Ag, Ni, Al, etc., can be used. As film forming methods, a vacuum deposition method, an activated reaction deposition method, any type of spattering method, any type of CVD method, a dip coating method, a spray coating method, etc., can be used. As light conductive layers, an amorphous silicon (a-Si) alloy photoreceptor layer, an amorphous selenium alloy photoreceptor layer, or any type of organic photoreceptor layer (OPC), can be used.

Scorotron chargers 11Y, 11M, 11C, and 11K which are charging means, are used for each respective color image formation process of yellow (Y), magenta (M), cyan (C) and black (K), and uniformly charge the photoreceptor drum 10 by corona discharge using a control grid, which has a predetermined potential voltage with respect to the organic photoreceptor layer on the photoreceptor drum 10, and a discharge wire.

Numerals 12Y, 12M, 12C and 12K are a linear image exposure means (image exposure device) composed of light emitting elements linearly arranged in the axial direction of the photoreceptor drum 10, and a light collective fiber lens array (Selfoc lens) which is a life-sized image forming element. Each color image signal read by an image reading device, which is separately provided, is successively read from a memory, and respectively inputted into the exposure optical devices 12Y, 12M, 12C and 12K, as electric signals.

Developing devices 13Y, 13M, 13C, and 13K, which are developing means for each color, respectively accommodate one-component or two-component developers for yellow (Y), magenta (M), cyan (C) and black (K), and are respectively provided with developing sleeves 131, which respectively have a predetermined gap with respect to the peripheral surface of the photoreceptor drum 10, and are rotated in the same direction as the photoreceptor drum 10 at that development point.

Each developing device 13(Y, M, C, K) non-contact reversal-develops an electrostatic latent image, formed through charging by the chargers 11(Y, M, C, K) and by image exposure by the exposure optical devices 12(Y, M, C, K) on the photoreceptor drum 10, by applying a developing bias voltage.

Document images are read by an image reading apparatus, provided separately from this apparatus, and images read by an image pick-up element or edited by a computer, are temporarily stored in a memory as separate color image signals for Y, M, C and K.

Figure 10:
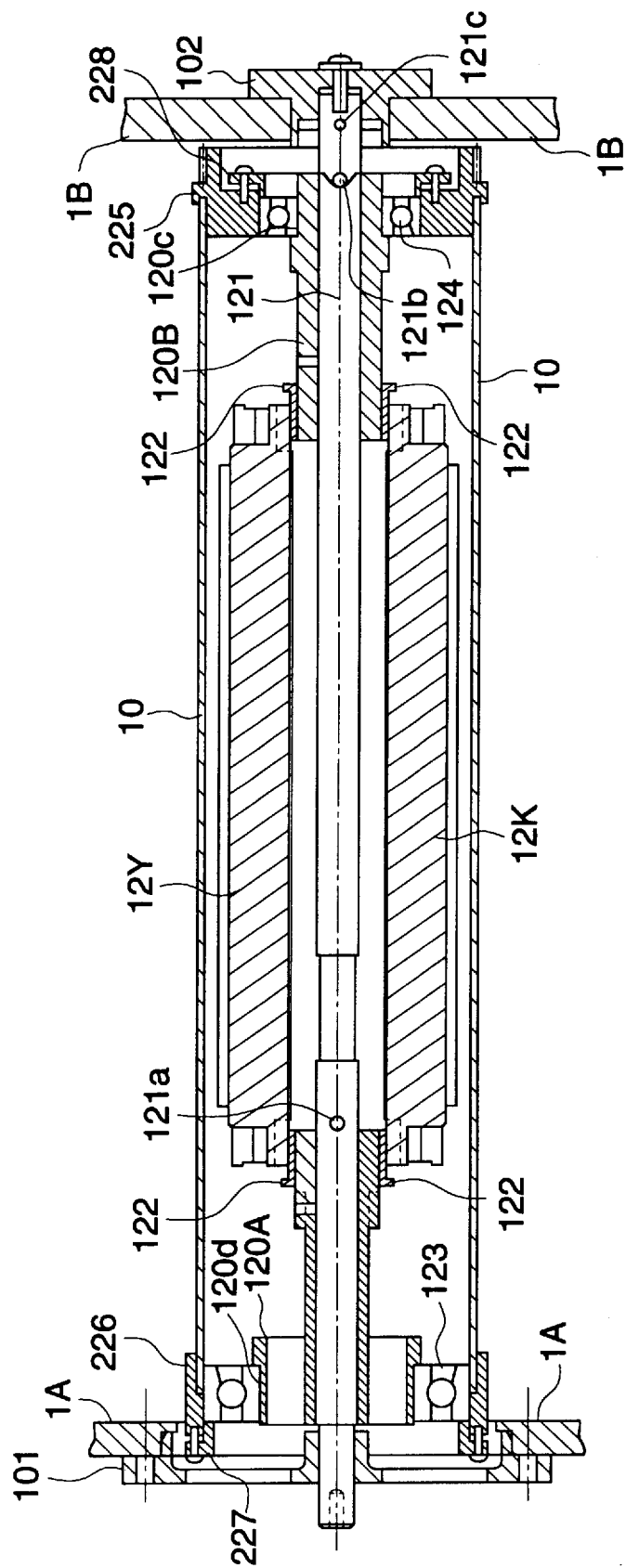
FIG. 10 is a sectional view showing a condition in which the image forming body including the image exposure devices is assembled between fixed side plates of the image forming apparatus.

A photoreceptor drive motor, not shown in the drawing, is rotated by the start of image recording, the photoreceptor drum 10 is rotated clockwise in FIG. 10, and simultaneously, a potential voltage is applied onto the photoreceptor drum 10 by the charging action of the scorotron charger 11Y, arranged at the left of the photoreceptor drum 10.

After the photoreceptor drum 10 has been provided with a potential voltage, exposure, due to electrical signals corresponding to an image signal of the first color signal, that is, yellow (Y), is started in the exposure optical device 12Y, and an electrostatic latent image corresponding to an image of yellow (Y) of the document image, is formed on the photoreceptor layer on the surface of the photoreceptor drum 10 by its rotational scanning.

The latent image is reversal-developed by the developing device 13Y under the condition that developing agent on the developing sleeve is in non-contact with the photoreceptor layer, and a yellow (Y) toner image is formed corresponding to the rotation of the photoreceptor drum 10.

Next, the photoreceptor drum 10 is further provided with a potential voltage on the yellow (Y) toner image by the charging action of the scorotron charger 11M, arranged at the left of the photoreceptor drum 10 and an upper portion of 11Y; exposure is carried out due to electrical signals corresponding to the image signal of the second color signal of the exposure optical system 12(M), that is, the magenta (M) image signal, and a magenta (M) toner image is formed by successively being superimposed on the yellow (Y) toner image by non-contact reversal-development by the developing device 13M.

By the same process, a cyan (C) toner image corresponding to the third color signal is further formed by being superimposed on the above toner images, by the scorotron charger 11C, provided above the photoreceptor drum 10, exposure optical system 12C and developing device 13C; a black (K) toner image is successively formed by being superimposed on the above three toner images, by the scorotron charger 11K, arranged at the right of the photoreceptor drum 10 and a lower portion of the C image forming means, exposure optical system 12K, and developing device 13K; and a color toner image is formed on the periphery of the photoreceptor drum 10 during its one rotation.

Exposure onto the organic photoreceptor layer of the photoreceptor drum 10 by these exposure optical devices 12Y, 12M, 12C, 12K is carried out through the transparent base body from the inside of the photoreceptor drum 10. Accordingly, exposure of the image corresponding to the second, the third, and the fourth color signals is carried out, barely influenced by the previously formed toner images, and electrostatic latent images approximately equal in quality to the image corresponding to the first color signal, can be formed.

Each replenishing color toner is supplied from toner replenishment tanks 14Y, 14M, 14C, and 14K to corresponding developing devices 13(Y, M, C, K). Developing devices 13(Y, M, C, K) are maintained in non-contact with the photoreceptor drum 10, at a predetermined interval of 100 μm–1000 μm, for example, through a stopper roller, not shown in the drawing. When developing is carried out by each developing device 13(Y, M, C, K), a developing bias voltage of DC voltage or AC voltage superimposed on DC voltage, is applied on each developing sleeve 131; jumping development by one- or two-component developer accommodated in the developing device, is carried out; and non-contact reversal development, in which DC bias voltage having the same polarity as the toner, is applied onto the photoreceptor drum 10 so that toner is adhered onto the exposed portions, is carried out with respect to the photoreceptor drum 10 in which a transparent conductive layer is electrically grounded.

A transfer sheet P, which is a transfer material, is sent from a sheet feed cassette 21, which is a transfer sheet accommodating means, and conveyed to a timing roller 22. A color toner image formed on the peripheral surface of the photoreceptor drum 10 is transferred onto the transfer sheet P which is fed in timed relationship with the toner image on the photoreceptor drum 10 by a drive of the timing roller 22, in the transfer device 15.

The transfer sheet P onto which the toner image has been transferred, is discharged by the discharger 16, and separated from the peripheral surface of the photoreceptor drum. After that, the transfer sheet P is conveyed to a fixing device 24 by a conveyance belt 23, which is a conveyance means. The transfer sheet P is heated and pressure-contacted by the fixing device 24, and toner is fused and fixed onto the transfer sheet P, and then, is delivered from the fixing device 24. After that, the transfer sheet P is conveyed by the paired delivery sheet conveyance roller 25, and is delivered through delivery roller 26 onto a tray 27 in the upper portion of the apparatus, while the toner image surface is facing downward.

On the other hand, the surface of the photoreceptor drum 10, from which the transfer sheet P has been separated, is scraped by a cleaning blade 17a in a cleaning device 17, and residual toner is removed and cleaned. Then, the photoreceptor drum 10 continues the toner image formation of the document image, or temporarily stops and starts the toner image formation of a new document image. The waste toner scraped off by the cleaning blade 17a and a cleaning roller 17b, is delivered to a waste toner container 17d through a toner conveyance screw 17c and a toner conveyance pipe. After cleaning, the cleaning blade 17a and the cleaning roller 17b are kept to be separated from the photoreceptor drum 10 so as not to damage the photoreceptor drum 10.

FIG. 2(A) is a sectional view of a main portion of the image exposure device, and FIG. 2(B) is a perspective view of FIG. 2(A). Each of image exposure devices 12Y, 12M, 12C and 12K have the same structure, and therefore, these devices are called the image exposure device 12 hereinafter, and will be described below. As shown in FIGS. 2(A) and 2(B), the exposure device 12 which is an image exposure means for each color, comprises: a light emitting element 12a, which emits exposure light and composed of; a linear exposure element in which light emitting elements, such as FLs (fluorescent substance emitting element), ELs (electro-luminescence element), PLs (plasma discharging element), or LEDs (light emitting diode), are arranged in the shape of an array in the direction of an axis of the photoreceptor drum 10; or linear exposure elements in which elements having optical shutter functions, such as LISA (photoelectro-magnetic effect optical shutter array), PLZT (transparent piezoelectric shutter array), LCS (liquid crystal shutter), etc. are linearly arranged; and further comprises a light collective fiber lens array (a Selfoc lens) 12b as a life-sized image formation element. The exposure optical systems are formed into a unit, in which the light emitting element 12a and the Selfoc lens as a life-sized image formation element are mounted on a holding member 12c. This unit is mounted on an optical system supporting body 120, on which the exposure device provided inside the photoreceptor drum 10 is fixed, by a method which will be described later. Each color image signal stored in a memory is successively read from the memory and is inputted into the exposure device 12 for each color as an electric signal. The wavelength of light beams from the light emitting elements 12a used in this example is within 600 to 900 nm.

The light emitting element 12a is an array in which, for example, LEDs are linearly arranged, and which is formed on a base plate 12d, for example, made of ceramic or Pyrex glass. Further, the Selfoc lens 12b is fixed on the holding member 12c with an adhesive agent, shown by black dots in the drawing, the base plate 12d of the light emitting element 12a is also fixed onto the holding member 12c with the adhesive agent, shown by slanting lines in the drawing, and thus the image exposure device 12 is structured. The exposure device 12 for each color is held at a predetermined position by an assembling jig, which will be described later, and fixed onto the optical system supporting body 120 with an adhesive agent, or the like.

FIGS. 3(A) and 3(B) are views showing an assembled condition of the image exposure devices 12(Y, M, C, K) onto the optical system supporting body 120, before the image forming body is assembled. FIG. 3(A) is a side view of the image exposure devices, and FIG. 3(B) is a front view of FIG. 3(A). In the drawings, the direction of x (the primary scanning direction) is perpendicular to the movement direction of the photoreceptor drum 10, and shows the direction of positioning the linear light emitting element 12*a*, which is provided on the image exposure device 12, in parallel with the axis of the photoreceptor drum 10. The y-direction (the subsidiary scanning direction) shows the movement direction of the photoreceptor drum 10. The z-direction (the focus positioning direction) shows the movement of the image exposure device 12 in the direction of the diameter of the photoreceptor drum 10, and shows the adjustment direction of the focusing position of the Selfoc lens 12*b*.

Figure 4:
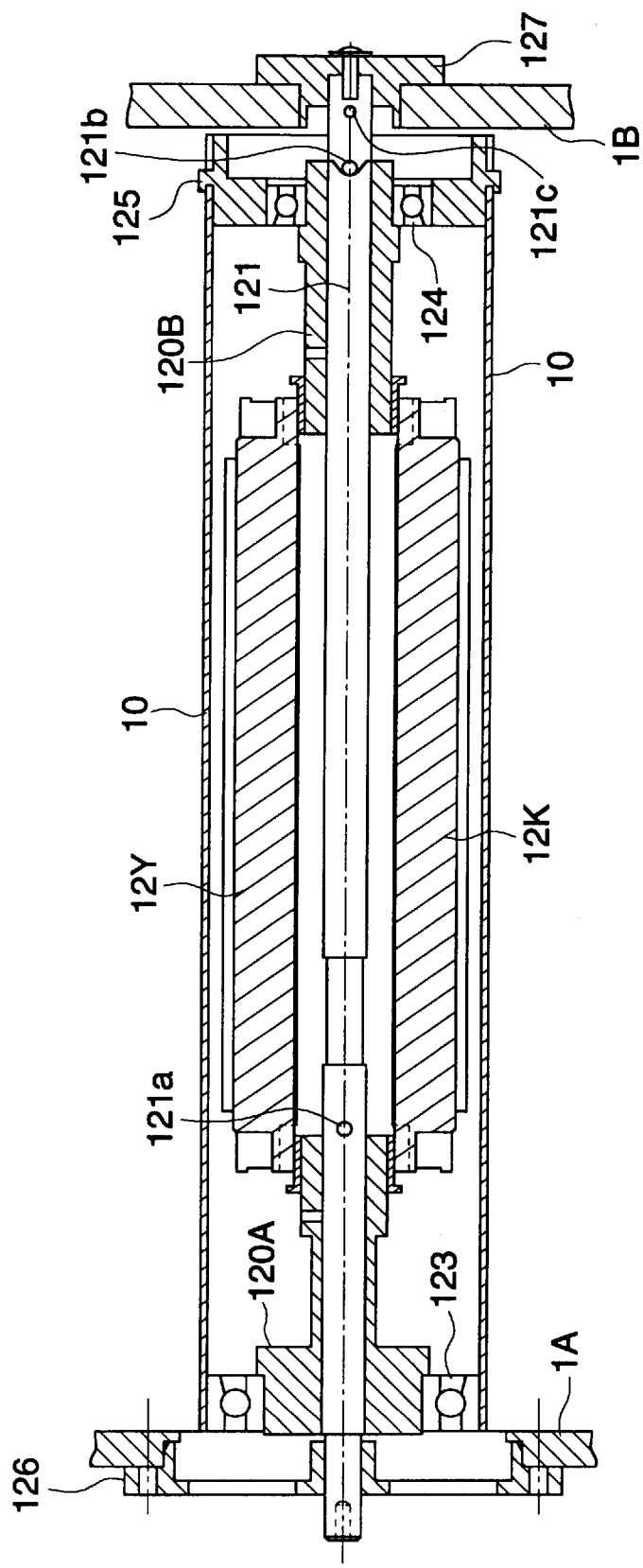
FIG. 4 is a sectional view showing a condition in which an image forming body including the image exposure devices is assembled between fixed side plates of an image forming apparatus.
Figure 5:
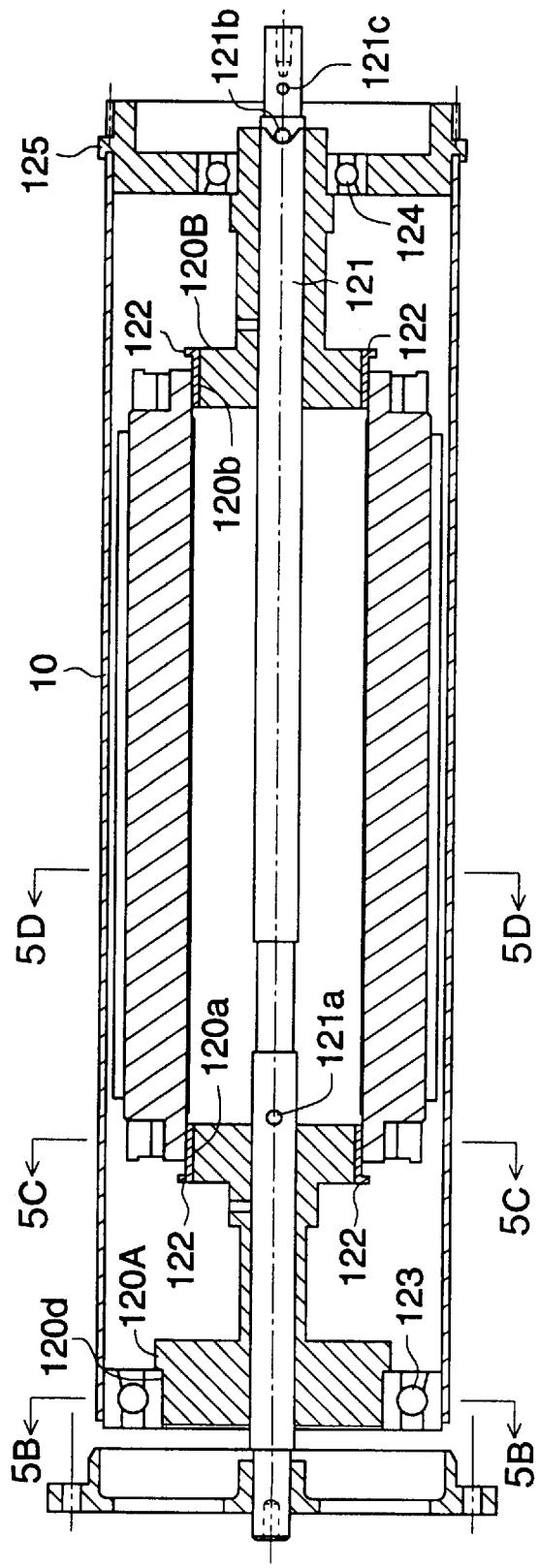
FIG. 5(A) is a sectional view showing a condition before the image forming body including the image exposure devices is assembled between fixed side plates.
FIG. 5(B) is a sectional view taken on line 5(B)—5(B)
FIG. 5(C) is a sectional view taken on line 5(C)—5(C)
FIG. 5(D) is a sectional view taken on line 5(D)—5(D) of FIG. 5(A).
Figure 5:
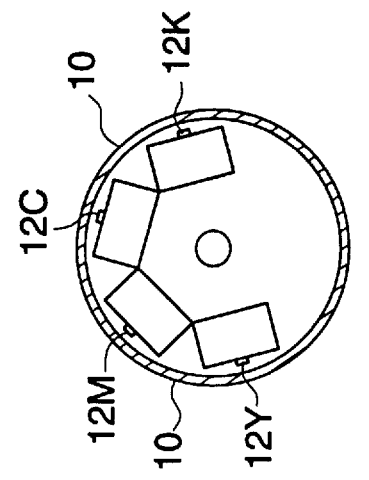
Figure 5:
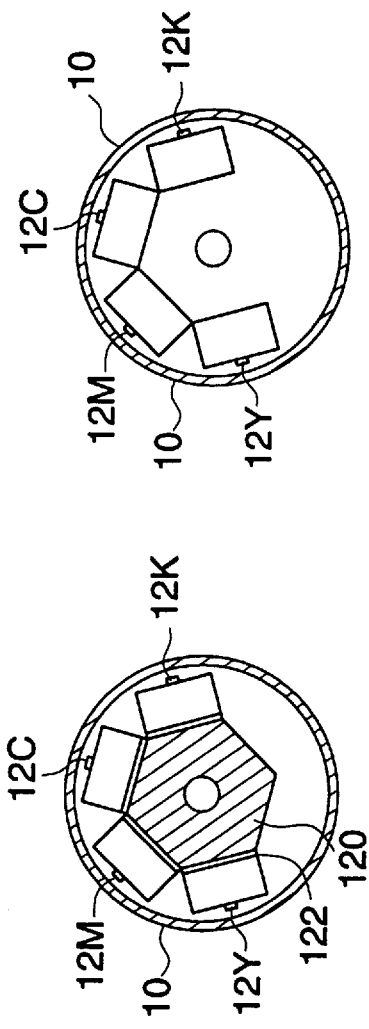
Figure 5:
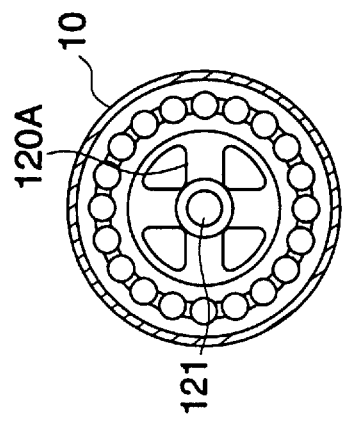
Figures 6A, 6B:
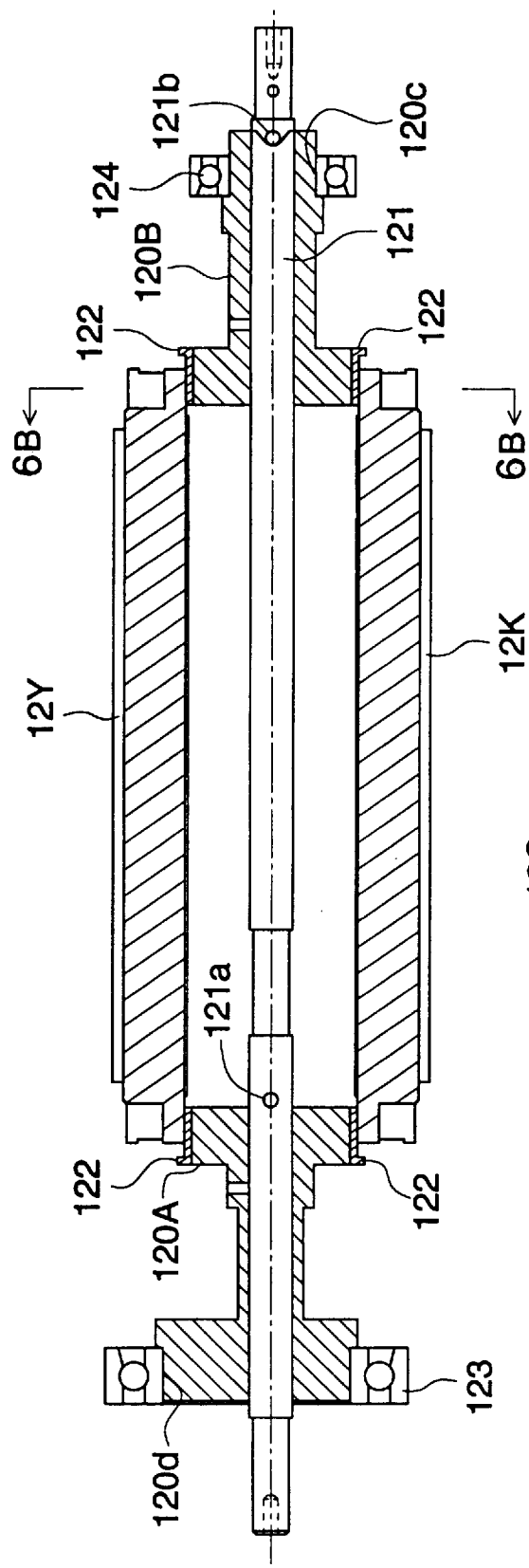
FIG. 6(A) is a sectional view showing a condition at the time of position adjustment of the image exposure devices.
FIG. 6(B) is a sectional view taken on line 6(B)—6(B) of FIG. 6(A).

FIG. 4 is a sectional view showing a condition in which the image forming body 10 including the image exposure devices 12(Y, M, C, K), is assembled between fixed side plates 1A and 1B of the apparatus main body of the image forming apparatus. FIG. 5(A) is a sectional view showing a condition before the image forming body 10 including the image exposure devices 12 (Y, M, C, K), is assembled between the fixed side plates 1A and 1B. FIG. 5(B) is a sectional view taken on line 5(B)—5(B) in FIG. 5(A), FIG. 5(C) is a sectional view taken on line 5(C)—5(C), and FIG. 5(D) is a sectional view taken on line 5(D)—5(D) in FIG. 5(A). FIG. 6(A) is a sectional view showing a condition in which the image exposure devices 12(Y, M, C, K) are adjusted for positioning, and FIG. 6(B) is a sectional view taken on line 6(B)—6(B) in FIG. 6(A).

The optical system supporting body 120 is divided into two optical system supporting bodies (left and right supporting bodies) 120A and 120B, by which both ends of each of image exposure devices 12(Y, M, C, K) are supported, and which are respectively fitted on and supported by a central shaft 121. Both ends of the image exposure device 12(Y, M, C, K) are assembled on the outer peripheral surfaces of the optical system supporting bodies 120A and 120B, and fixed thereon. Two pins 121*a* and 121*b* are respectively studded at predetermined positions on the shaft 121. After the image exposure devices 12(Y, M, C, K) have been fitted on the shaft 121, positioning is carried out in the axial direction such that a V-slot on the right side surface of the right optical system supporting body 120B shown in the drawing, comes into contact with the right pin 121*b*, and the right side surface of the left optical system supporting body 120A in the drawing, comes into contact with the left pin 121*a*.

In this connection, in the optical system supporting body 120, when the optical system supporting bodies 120A and 120B, and the shaft 121 are initially integrally formed into one body, the above operations are not necessary.

Supporting portions 120*a* and 120*b* of the optical system supporting bodies 120A and 120B, on which both ends of the image exposure devices 12(Y, M, C, K) are assembled and by which they are supported, have regular hexagonal prism-like side surfaces. The supporting portions 120*a* and 120*b* are previously positioned on the surface plate so as to have an equally leveled surface. The above image exposure devices 12 (Y, M, C, K) are adjusted for positioning, and after that, fixed with an adhesive agent with a wedge-shaped spacer 122.

In another end portion (the left end portion in the drawing) of the optical system supporting body 120A, a cylindrical surface portion 120*d* is formed concentrically with the shaft 121, and an inner ring portion of a ball bearing member (the position regulation member) 123 is pressure-fitted on the cylindrical surface portion 120*d*. The outer ring portion of the ball bearing member 123 is pressure-fitted into the inner diameter portion of the left end, in the drawing, of the image forming body 10.

The other end portion (the right end portion in the drawing) of the optical system supporting body 120B has a cylindrical surface portion 120*c* concentrically formed with the shaft 121, and the inner ring portion of the ball bearing member (position regulation member) 124 is pressure-fitted on the cylindrical surface portion 120*c*. The outer ring portion of the ball bearing member 124 is pressure-fitted into the inner diameter portion of a driving member 125 of the image forming body. The image forming body driving member 125 is engaged with the inner diameter portion of the image forming body 10, and fixed.

The inner diameter portion of a left side plate assembling member 126 is engaged with the left-most end portion, in FIG. 4, of the shaft 121, and a flange portion of the left side assembling member 126 is positioned and fixed onto a left side plate 1A of the image forming apparatus. The inner diameter portion of a right side plate assembling member 127 is engaged with the right-most end portion, in the drawing, of the shaft 121, a flange portion of the right side plate assembling member 127 comes into contact with the right side plate 1B of the image forming apparatus, and is positioned and fixed onto the right side plate 1B by a screw which is screwed into the right-most end portion of the shaft 121. In this connection, a pin 121*c* which is near the right end of the shaft 121, is engaged with a mounting reference groove, not shown in the drawing, provided in the inner diameter portion of the right side plate assembling member 127, and the rotational direction of the shaft 121 is positioned.

Due to the above structure, after the position of the image exposure means 12(Y, M, C, K) has been adjusted, the assembled position of the image exposure means 12(Y, M, C, K) and outer diameter portions of ball bearing portions 123 and 124 are integrally fixed, and coaxial with each other, so that no relative positional error occurs. Accordingly, when the image forming body 10 is mounted and assembled in this condition as shown in FIGS. 5(A) through 5(D), and then mounted into the image forming apparatus, which is an actual apparatus, as shown in FIG. 4, accuracy at the time of position adjustment can be maintained, and also the accurate mounting can be attained. Thus, when the system is structured such that ball bearings 123 and 124, which are position regulation members, are directly assembled onto the optical supporting body 120; the focus is adjusted using the position regulation members 123 and 124 as a reference; and the optical supporting body 120 is mounted into a mounting reference portion of the image forming apparatus main body using the position regulation members 123 and 124 as a reference, then, the accuracy of the focused position is greatly enhanced.

Figure 7:
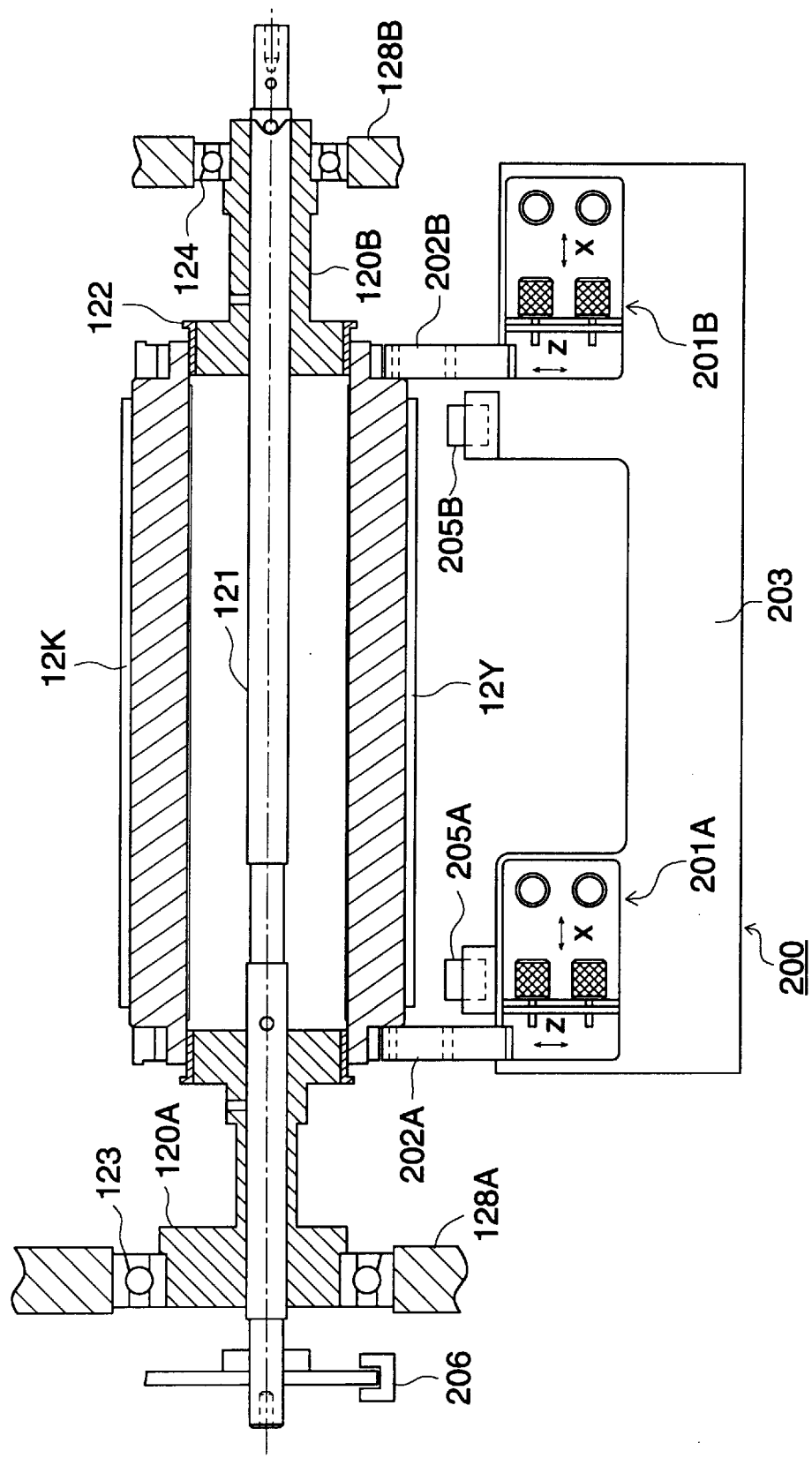
FIG. 7 is a plan view of an exposure optical system assembling jig to adjust the position of the image exposure means.
Figure 8:
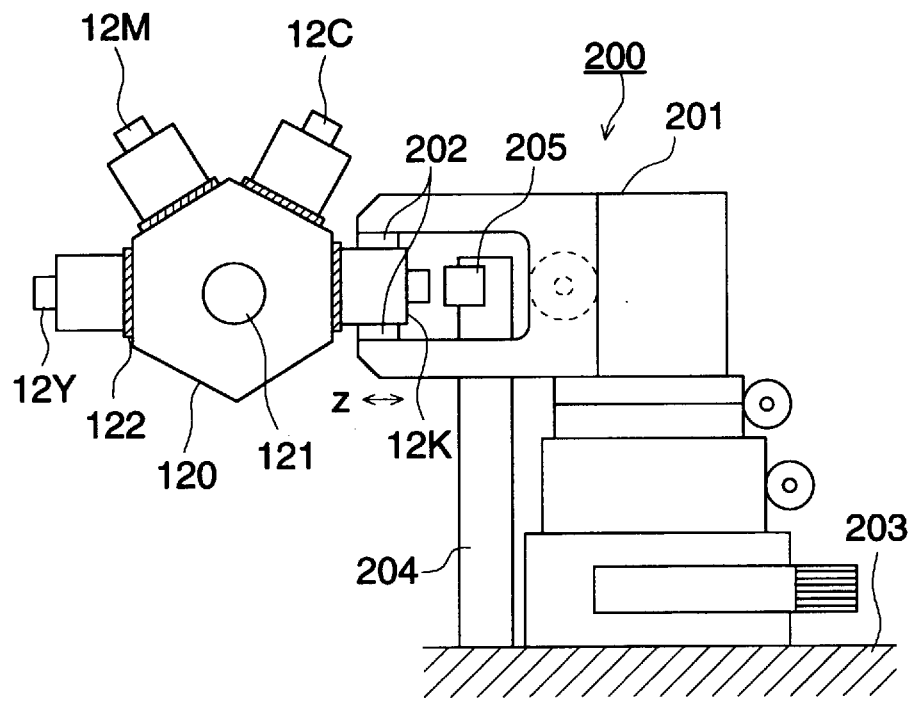
FIG. 8 is a front view of the exposure optical system assembling jig.

FIG. 7 is a plan view of the exposure optical system assembling jig 200 to adjust the position of the image exposure means 12(Y, M, C, K). FIG. 8 is a front view of the exposure optical system assembling jig 200.

End portions of the optical system supporting bodies 120A and 120B to support the image exposure means 12(Y, M, C, K) are respectively engaged with supporting members 128A and 128B through ball bearings 123 and 124, and are rotatably supported. A rotary encoder 206 is provided on one end of the shaft 121 penetrating the optical supporting bodies 120A and 120B, and accurately determines the position of the image exposure means 12Y, 12M, 12C and 12K in the rotational direction (the subsidiary direction y).

Both near-end portions of one image exposure means (for example, 12Y in the drawing) in the image exposure means 12, are held by holding portions 202A and 202B of two left and right minute movement stages 201A and 201B. The minute movement stages 201A and 201B are located on a fixed block 203 having a predetermined positional relationship with the supporting members 128A and 128B, and minutely move the holding portions 202A and 202B in the three dimensional directions (x, y, z directions). In this way, the minute movement stages 201A and 201B always maintain a predetermined positional relationship with the bearing members 123 and 124 through the fixed block 203, supporting members 128A and 128B. Herein, the x-direction shows the primary scanning direction, the y-direction shows the subsidiary scanning direction, and the z-direction shows the focus adjustment direction.

Light detection means (the light detection sensor ) 205A and 205B are arranged respectively facing both ends of the linear Selfoc lens 12b of the image exposure means 12Y on the upper end of a support 204 fixed on the fixed block 203. The light detection means 205A and 205B are composed of, for example, 2-dimensional CCD sensors, and are set at an image forming position by the exposure optical system 12, using the reference image forming body 10, that is, a position corresponding to an image formation reference position on the outer peripheral surface of the reference image forming body 10 (because the LED light beams pass the transparent base body of acrylic resin, the refractive index of which differs from that of air. The light detection means 205A and 205B also respectively always have a predetermined positional relationship with the bearing members 123 and 124 through the fixed block 203, supporting members 128A and 128B. Then, x, y positions and the focus position z of the image exposure means 12Y are adjusted by being detected by the light detection means 205A and 205B under the condition that the linear light emitting element 12a corresponding to specific pixels on both ends of the image exposure means 12 is activated. The light detection means 205A and 205B are connected to a detection circuit and a display means shown in FIG. 9, and the output is displayed on CRT monitors. After the adjustment of the x, y and z positions has been completed, a spacer 122 is inserted between the image exposure means 12Y and the optical system supporting bodies 120A and 120B, the position is fixed, and the image exposure means are fixed with an adhesive agent. As described above, the light detection means 205A and 205B are assembled using the bearing member as a reference, thereby, the light detection means 205A and 205B always have a predetermined distance with respect to the bearing member, that is, the rotating photo-receptor surface, and the LED can be moved for adjustment at the position on the photoreceptor surface on which an image is appropriately formed.

Initially, after the adjustment of the image exposure means 12Y has been completed, the rotary encoder 206 is turned for a predetermined angle, and the adjustment of the image exposure means 12M is carried out in the same manner. The adjustment of the image exposure means 12M and 12K are also, subsequently, carried out in the same manner.

Figure 9:
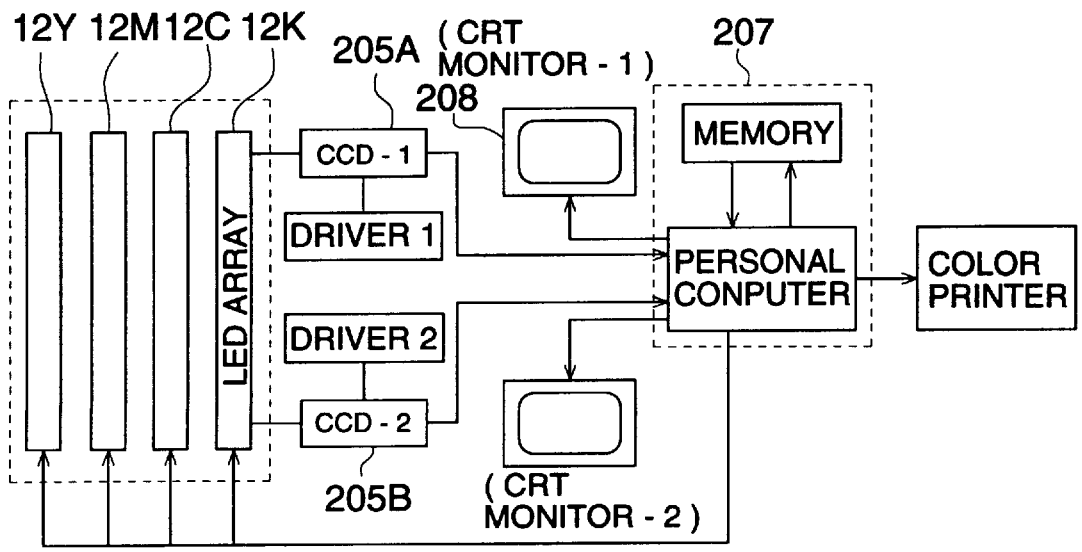
FIG. 9 is a block diagram showing an adjustment control means of the image exposure means.

FIG. 9 is a block diagram showing an adjustment control means of the image exposure means 12. Under the condition that the linear light emitting element (LED array) 12a corresponding to specific pixels on both ends of the image exposure means 12 is activated, the position and brightness (focus) of the activated LEDS are measured by the light detection means (2-dimensional CCD sensor) 205A and 205B. The light detection means 205A and 205B are 2-dimensional CCD sensors composed of, for example, 500×500 pixels, for which the size of one pixel is 5–10 $\mu$m. The image exposure means 12 is minutely moved in X, Y, and Z directions by the minute movement stages 201A and 201B; and a control means 207 detects that the image formation position of the activated specific LEDs conforms to specific pixels in an area of the 2-dimensional CCD sensors 205A and 205B, and displays the same on the display means (CRT monitor) 208.

Next, an adjustment process of the image exposure means, using the exposure optical system assembling jig 200, will be described.

(1) The optical system supporting bodies 120A and 120B are fitted onto the central shaft 121, and supporting portions 120a and 120b, having regular hexagonal prism-like side surface, of the optical system supporting bodies 120A and 120B, are positioned so as to form an equal level surface on the fixed block.

(2) The V-shaped groove of the right side surface of the right optical system supporting body 120B in the drawing, comes into contact with the right pin 121b of the shaft 121, and the optical system supporting body 120B is then fixed onto the shaft 121 by screws. The right side surface of the left optical system supporting body 120A in the drawing, comes into contact with the left pin 121a of the shaft 121, and that optical system supporting body 120A is also fixed onto the shaft 121 by screws.

(3) A ball bearing member 123, which is a position regulating member, is fitted on the left end cylindrical surface portion 120d of the optical system supporting body 120A, and a ball bearing member 124, which is a position regulating member, is fitted onto the right end cylindrical surface portion 120c of the optical system supporting body 120B (refer to FIGS. 6(A) and 6(B)).

(4) The left side ball bearing member 123 is assembled into the supporting member 128A, the right side ball bearing member 124 is assembled into the supporting member 128B, and the ball bearing members 123 and 124, and the shaft 121 are horizontally mounted.

(5) A rotary encoder 206 is assembled on the end of the shaft 121.

(6) The rotational position of the optical system supporting member 120 is set so that the bottom portion of the image exposure means 12Y accurately faces the supporting portion 120a of the optical system supporting body 120.

(7) Both end portions of the image exposure means 12Y are held by holding portions 202A and 202B of the minute movement stages 201A and 201B of the exposure optical system assembling jig 200 (refer to FIGS. 7 and 8).

(8) The minute movement stages 201A and 201B are operated so that the image exposure means 12Y is minutely moved in x- and z-directions, and the image exposure means 12Y is positioned and adjusted for focusing by a means shown in FIG. 9.

(9) A spacer 122 is inserted between the image exposure means 12Y and the supporting portion 120a of the optical system supporting body 120, these assemblies are fixed with an adhesive agent, and thus, mounting of the image exposure means 12Y is completed.

(10) Positioning adjustment for the image exposure means 12M, 12C and 12K are also carried out in the same manner as items (7) through (10).

(11) After adjustment of all image exposure means 12Y, 12M, 12C and 12k have been completed, the image forming body 10 and the image forming body driving member 125 are mounted in the stated order into ball bearing members 123 and 124 (refer to FIGS. 5(A) through 5(D)).

(12) The image forming body 10, including the image exposure means 12(Y, M, C, K), is inserted between fixed side plates 1A and 1B of the actual image forming apparatus 1; the left side plate mounting member 126 and the right side plate mounting member 127 are respectively fitted onto the shaft 121, and are fixed onto the fixed side plates 1A and 1B of the apparatus main body by screws or the like; and thus, assembling is completed.

The image forming body used in the present invention is not limited to the photoreceptor drum, which has been described in the above example, but also a belt type photoreceptor may be used for the image forming body. Further, in the above example, an image exposure device has been described which is included in the image forming body, however, the present invention is not limited to this example, but the image exposure device may also be arranged outside the image forming body.

According to the above-described first structure, when the position regulation member to regulate mounting position into the image forming body, is integrally provided on the optical system supporting body to support the image exposure means, the reference for position adjustment of the image exposure means can be equal to the reference for mounting into the image forming apparatus, and the image exposure means can be mounted into the image forming apparatus while keeping the positioning accuracy and the focusing accuracy at the adjustment. Due to this, highly accurate assembly can be easily carried out, and thereby, the assembly time period can be shortened.

According to the above-described second structure, the position regulation member to regulate mounting position into the image forming body, is integrally provided on end portions of the optical system supporting body to support the image exposure means; and after the image exposure means has been assembled onto the optical system supporting body, its position has been adjusted, and it has been fixed, by the light detection means fixed and arranged outside the image exposure means, and the exposure optical system assembling jig having a movement means to hold the image exposure means and move it, the image exposure means, the optical supporting body, and the position regulation member are inserted inside the image forming body and fixed with the position regulation member. Thereby, the image exposure apparatus is positioned in the primary scanning direction, subsidiary scanning direction, and focus positioning direction with respect to the image forming body. Further, the relative positions among exposure devices in the primary scanning direction, subsidiary scanning direction and focus positioning direction are determined, and highly accurate assembly can easily be carried out, resulting in an excellent image.

FIG. 10 is a sectional view showing a condition in which the image forming body 10 including the image exposure device 12(Y, M, C, K) is mounted between the apparatus main body fixed side plates 1A and 1B of the image forming apparatus. FIG. 11(A) is a sectional view showing a condition before the image forming body 10 including the image exposure device 12(Y, M, C, K) is mounted between the fixed side plates 1A and 1B. FIG. 11(B) is a sectional view taken on line 11(B)—11(B) in FIG. 11(A), FIG. 11(C) is a sectional view taken on line 11(C)—11(C), and FIG. 11(D) is a sectional view taken on line 11(D)—11(D) in FIG. 11(A). Numerals in FIGS. 10 and 11(A) through 11(D) which have the same functions as those in FIGS. 4 and 5(A) through 5(D), are denoted by the same numerals. Points different in FIGS. 4 and 5(A) through 5(D) will be described below.

For the ball bearing members 123 and 124, an angular ball bearing or a deep groove type ball bearing, which has a strong holding power also in the direction of thrust, is used.

A portion of the outer diameter portion of the ball bearing member 123 is press-fitted into a ring-like pressure holding member 226, and as shown in the drawing, comes into contact with the left end surface of the image forming body 10 and fixed. As shown in the drawing, a pressing member 227 is fixed on the left side of the pressure holding member 226 by a screw 227S. The end surface of the pressing member 227 presses the outer ring portion of the ball bearing member 123. Pressing force $F_1$ on the outer ring portion of the ball bearing member 123 is adjusted by the adjustment of the fastening force of the screw 227S.

A pressing member 228 having almost the same shape as the pressing member 227 is fixed also onto an image forming body driving member 225, fixed on the right side of the image forming body 10 as shown in FIGS. 10 and 11(A) through 11(D), by a screw 228S. The end surface of the pressing member 228 presses the outer ring portion of the ball bearing member 124. The pressing force $F_2$ onto the outer ring portion of the ball bearing member 124 is adjusted by the adjustment of the fastening force of the screw 228S.

The pressing forces $F_1$ and $F_2$ are adjusted within 10–500N (Newton). When the pressing force is less then 10N, the pressing force onto the outer ring portion of the ball bearing member 123 is insufficient, and backlash is caused in the direction of the thrust. When the pressing force is more than 500N, excessive force is applied onto the ball bearing member 123, and rotation in the radial direction is not smooth. When the heavier load is further applied, the image forming body 10 or the ball bearing member 123 is deformed. Relating to the pressing forces $F_1$ and $F_2$, when the screws 227S and 228S are fastened by using a torque driver set to a predetermined torque, the ball bearing members 123 and 124 are always pressed by a predetermined pressing force through the pressing members 227 and 228.

As shown in FIG. 10, an inner diameter portion of the left side plate fixing member 101 is engaged with the leftmost end portion of the shaft 121, and a flange portion of the left side plate fixing member 101 is positioned and fixed onto the left side plate 1A of the image forming apparatus. The inner portion of the right side plate fixing member 102 is engaged with the right-most end portion, in the drawing, of the shaft 121, a flange portion of the right side plate fixing member 102 comes into contact with the right side plate 1B of the image forming apparatus, and is positioned and fixed onto the right side plate 1B by a screw, which is screwed into the right-most end portion of the shaft 121. Incidentally, a pin 121c near the right end of the shaft 121, is engaged with a mounting reference groove, not shown in the drawing, provided in the inner diameter portion of the right side plate fixing member 102, and the shaft 121 is positioned in the rotational direction.

Due to the above structure, the outer ring portions of the ball bearing members 123 and 124, the image forming body 10, the image forming body driving member 225, the pressure holding member 226, the pressing members 227 and 228 are integrally formed, and can all be rotated. On the other hand, the image exposure means 12(Y, M, C, K), the optical system supporting members 120A and 120B, the shaft 121, the inner ring portions of the ball bearing members 123 and 124, the left side plate fixing member 101, and the right side plate fixing member 102 are integrally formed, mounted and fixed at a predetermined position on the apparatus main body's fixed side plates 1A and 1B.

Due to this structure, when the ball bearings 123 and 124 are pressed from the left or right sides in the primary scanning direction of the image forming body 10 by pressing members 227 and 228 after the relative positions of the image exposure means 12(Y, M, C, K) have been adjusted, and the image forming body 10 has been mounted, play in the primary scanning direction of the image forming body 10 is eliminated. Accordingly, when all sub-assemblies are assembled as shown in FIGS. 11(A) through 11(D), and further mounted into the actual image forming apparatus main body, as shown in FIG. 10, the image exposure means can be accurately mounted while maintaining the accuracy at the position adjustment. As described above, in the image forming apparatus, provided with the angular ball bearing members 123 and 124, onto which pressure is previously applied by the pressing members 227 and 228, no play occurs in the primary scanning direction even over an extended time period, and thereby, the doubling in the primary scanning direction can be minimized.

Figure 12:
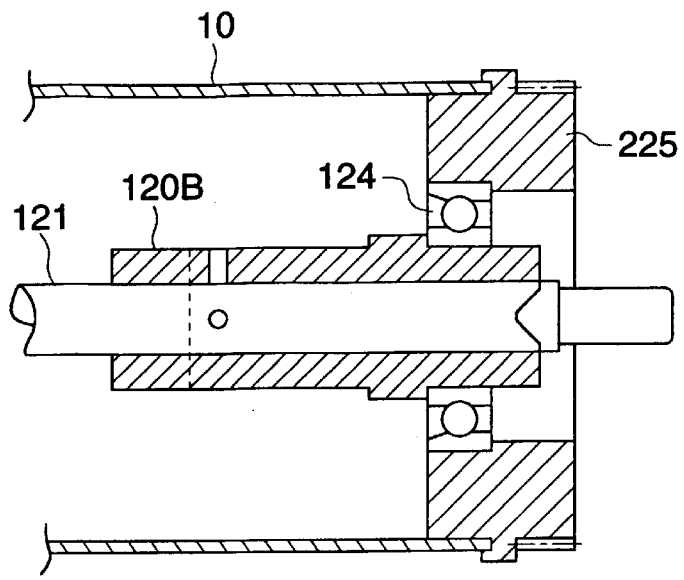
FIG. 12 is a partial sectional view of the image forming body in another example of the present invention.

When a member, shaped such as the image forming body driving member 225 in FIG. 12, is used instead of the image forming body driving member 225 and the pressing member 228, shown in FIG. 10 and FIGS. 11(A) through 11(D), the right side ball bearing member 124 is also pressed by the left side pressing member 227, and therefore, even when the pressing member is not specifically provided on the right side, the same effects are obtained.

Figure 13:
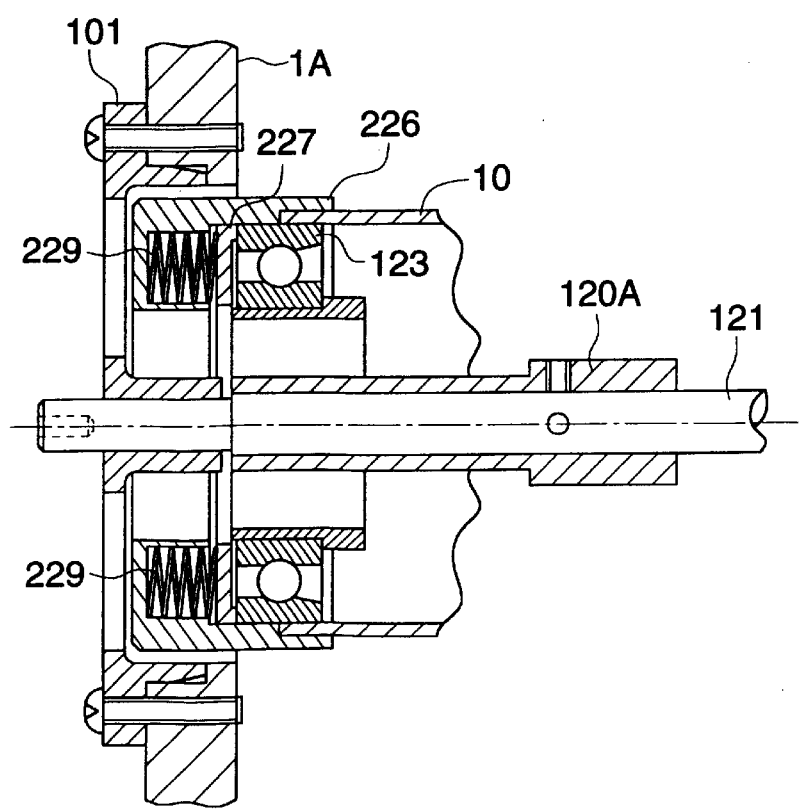
FIG. 13 is a partial sectional view of an end portion of the image forming body showing still another example of the present invention.
Figure 14:
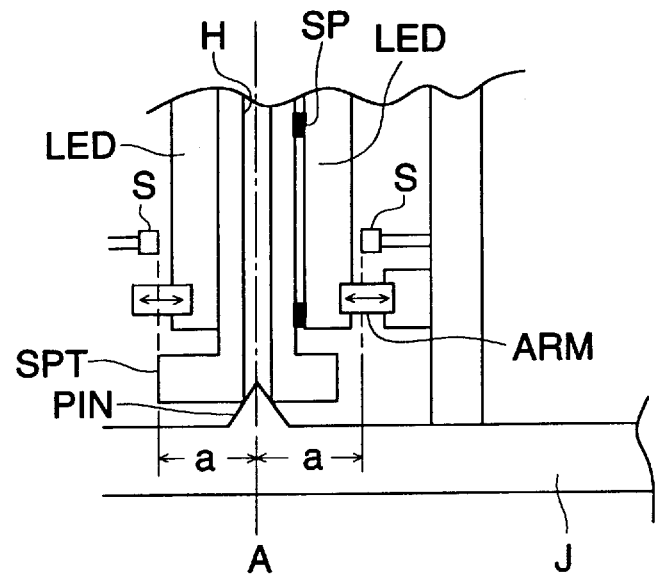
FIGS. 14(A) and 14(B) are views showing an example of conventional methods using an optical system assembling jig for assembling each linear exposure optical system (LED) on an optical supporting body, and for position adjustment and focus adjustment.
Figure 14:
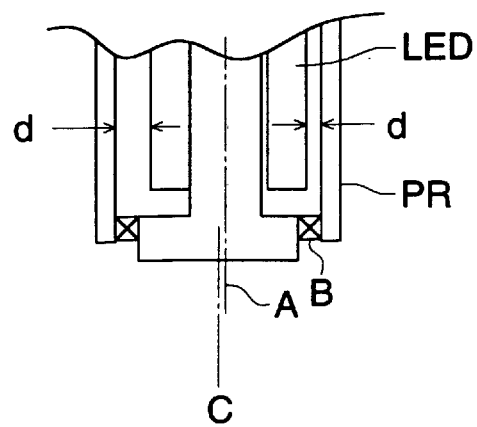

FIG. 13 is a partial sectional view showing still another example of the holding means of the image forming body of the image forming apparatus according to the present invention. In the drawing, portions having the same function as those in the foregoing examples are denoted by the same numerals. Points differing from the foregoing examples, will be described below.

The pressing member 227, which comes into contact with the outer ring portion of the ball bearing portion 123, fixed onto one shaft end portion of the image forming body 10, is pressed by a plurality of springs 229 housed in the pressure holding member 226, at a pressing force $F_1$. The pressing member 228 fixed on the other shaft end of the image forming body 10, also has the same structure, and the outer ring portion of the ball bearing member 124 is also pressed by the pressing force of a plurality of springs.

The bearing means of the image forming body used in the present invention, is not always limited to the use for a photoreceptor drum described in the above examples, but can also be used for a driving roller to rotatably support a belt type photoreceptor. Further, it can be applied to an intermediate transfer body. Still further, in the above examples, an image forming body in which the image exposure devices are arranged, has been described. However, the present invention is not always limited to this, but may also be applied to an image forming body, outside of which the image exposure devices are arranged.

According to an image forming apparatus of the present invention, play in the thrust direction of the bearing member which rotatably supports an image forming body, is negated. Due to this, the doubling in the superimposed images caused by conventional bearing members, is minimized, and an image forming apparatus which is excellent in image quality and resolution, can be provided.

What is claimed is:

1. An image forming apparatus comprising:
   (a) an image forming body which is rotatable in a subsidiary scanning direction;
   (b) a plurality of imagewise exposure devices for imagewise exposing the image forming body, said exposure devices being arranged to face the image forming body and to be aligned in a straight line in a primary scanning direction perpendicular to the subsidiary scanning direction of the image forming body;
   (c) a common supporting member for supporting the plurality of exposure devices; and
   (d) bearing members provided on first and second ends of the common supporting member,
   wherein the plurality of exposure devices are: (i) radially arranged on the common supporting member with respect to a rotation axis of said image forming body, and (ii) fixed on the supporting member with respect to the bearing members,
   and wherein the image forming body is rotatable against the common supporting member through the bearing members.

2. The image forming apparatus of claim 1, wherein the plurality of exposure devices and the common supporting member are disposed inside the image forming body.

3. The image forming apparatus of claim 2, wherein the bearing members are disposed inside the image forming body.

4. The image forming apparatus of claim 2, wherein the plurality of exposure devices and the common supporting member are integrally inserted inside the image forming body.

5. The image forming apparatus of claim 1, wherein the bearing members are provided in a vicinity of first and second ends of the image forming body.

6. The image forming apparatus of claim 1, wherein the bearing members each have an inner ring member and an outer ring member, and wherein the inner ring members are fixed on the first and second ends of the common support member and the outer ring members are fixed on the first and second ends of the image forming body.

7. The image forming apparatus of claim 6, wherein each outer ring member is fixed on an image forming body drive member which is integrated with the image forming body.

8. The image forming apparatus of claim 1, wherein a fixing position for each of the exposure devices with respect to the common supporting member is determined in accordance with a detecting result of a light detector which detects light emitted from each of the respective exposure devices, and wherein the light detector is arranged to face the exposure devices in reference to the bearing members.

9. The image forming apparatus of claim 8, wherein the light detector comprises a two-dimensional charge coupled device sensor.

10. The image forming apparatus of claim 1, wherein the bearing members each have: (i) a movable part for regulating an image forming position of the respective exposure devices with respect to the image forming body, and (ii) a fixed part, and wherein the image forming apparatus further comprises a pressing member for pressing the movable part of the bearings in the primary scanning direction of the image forming body.

11. The image forming apparatus of claim 10, wherein the respective imagewise exposure devices, the common supporting member, the bearing members and the pressing member are disposed inside the image forming body.

12. The image forming apparatus of claim 10, wherein the bearing members are provided in a vicinity of first and second ends of the image forming body, and the pressing member is disposed in a vicinity of at least one of the first and second ends of the image forming body.

13. The image forming apparatus of claim 12, wherein at least one of the bearing members comprises a rotatable ball bearing member, an inner ring portion of which is fixed on one of the first and second ends of the common supporting member and outer ring portion of which is fixed on one of the first and second ends of the image forming body, and wherein the outer ring portion of the ball bearing member is pressed by the pressing member in the primary scanning direction.

14. The image forming apparatus of claim 13, wherein the other member of the bearing members comprises a rotatable ball bearing member, an inner ring portion of which is fixed on one of the first and second ends of the supporting member and an outer ring portion of which is fixed on an end of an image forming body drive member which is integrated with the image forming body, and wherein the outer ring portion is pressed by the pressing member in the primary scanning direction of the image forming body.

15. The image forming apparatus of claim 13, wherein the ball hearing members comprise angular contact ball bearings.

16. The image forming apparatus of claim 10, wherein a pressing force of the pressing member is 10 to 500N.

* * * * *